Sept. 13, 1938.  P. DRAGON  2,129,679
NUT SHELLING MACHINE
Filed June 26, 1936    2 Sheets-Sheet 1
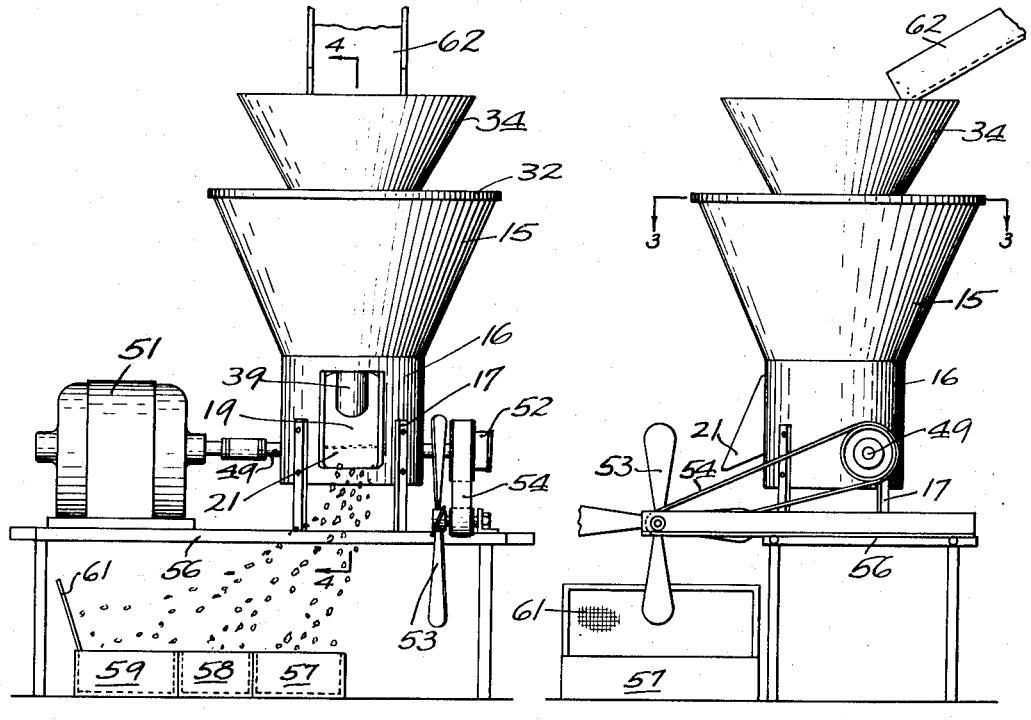
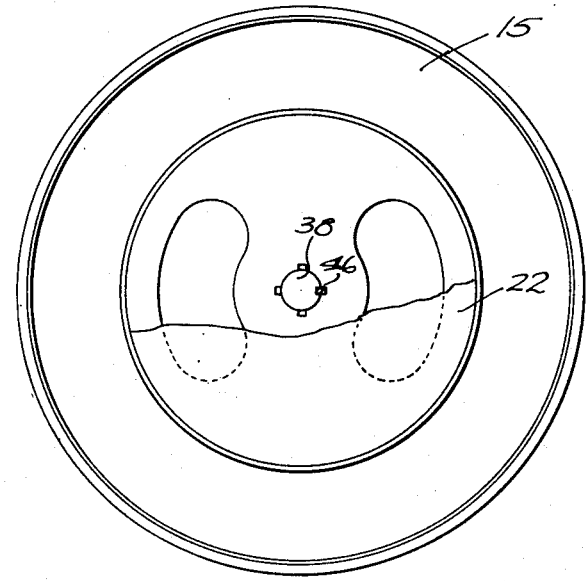
INVENTOR.
PAUL DRAGON
BY George B. White
ATTORNEY.

Sept. 13, 1938.  P. DRAGON  2,129,679
NUT SHELLING MACHINE
Filed June 26, 1936  2 Sheets-Sheet 2

INVENTOR.
PAUL DRAGON
BY George B. White
ATTORNEY.

Patented Sept. 13, 1938

2,129,679

UNITED STATES PATENT OFFICE 2,129,679

NUT SHELLING MACHINE

Paul Dragon, San Francisco, Calif.

Application June 26, 1936, Serial No. 87,332

5 Claims. (Cl. 146—11)

This invention relates to a nut cracker and sheller machine.

An object of this invention is to provide a machine for cracking and shelling nuts of various sizes and types and to efficiently separate the shells from the meat of the shelled nuts.

Particularly it is an object of the invention to crack and shell the nuts by rolling the nuts in a downwardly diminishing annular chamber between relatively movable cracking members and to separate the shells from the meat of the nuts by blowing the cracked products so as to utilize the difference between the gravity of the meat and of the shells of the nuts in separately collecting the meat and the shells.

Another object of this invention is to provide a nut cracker and sheller machine which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description and specifically pointed out in the appended claims, reference is had to the accompanying drawings for the illustrative embodiment of the invention, wherein:

Figure 1 is a front view of my machine.

Figure 2 is a side view of my machine.

Figure 3 is a sectional plan view of my machine the section being taken on the line 3—3 of Fig. 2, part of the drum cover being broken away.

Figure 4:
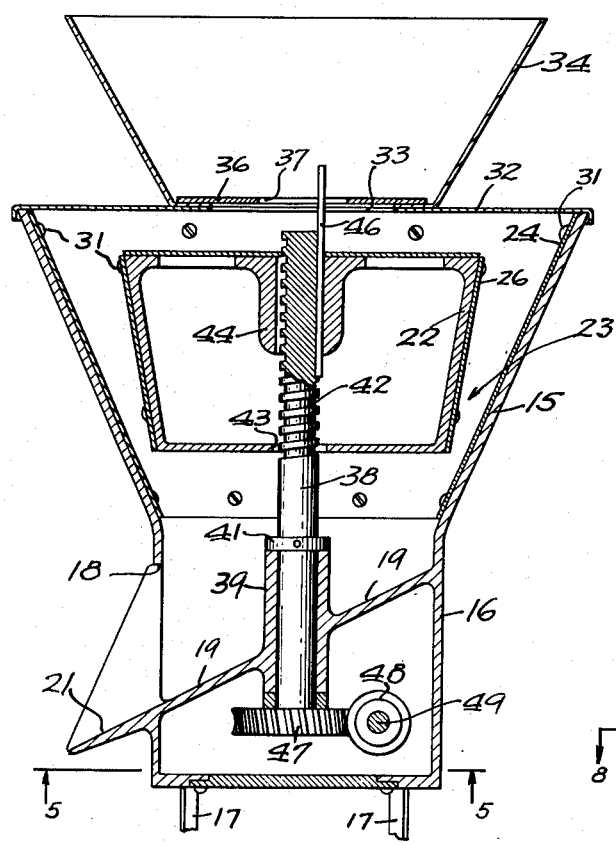
Figure 4 is a fragmental sectional view of my machine the section being taken on the line 4—4 of Fig. 1.

In its general organization my machine includes two conical members concentrically mounted one within the other so as to provide a downwardly diminishing substantially annular and conical space or chamber. Said members have replaceable linings on their opposing surfaces with a plurality of opposing projections. The inner member is rotatable so that the nuts introduced from the top are rolled and squeezed between said projections as the nuts are advanced by gravity in said chamber. At the outlet of the chamber the cracked nuts, separated from their shells, are guided in the path of a stream of air so as to be blown on a substantially horizontal path for a limited distance. The meat of the nuts, being heavier than the shells, will drop out of the airstream first into suitable receptacles, and then the shells still containing some meat, and then the entirely empty shells drop out of said stream to be separately collected. The apparatus is spaced above the series of receptacles in which the shell and the meat of nuts are collected so as to facilitate separation.

In detail the machine includes a conical shaped hollow outer shell 15 on the smaller end of which is formed a hollow cylindrical shaped casing 16. The casing 16 is suitably supported, for instance on legs 17, so that the wider end of the shell 15 is at the top. A discharge opening 18 is provided on the side of the casing 16. A partition wall 19 extends across said casing 16 and is inclined toward the lower edge of the discharge opening 18 so as to receive the cracked and shelled nuts from the shell 15 and guide the same toward said opening 18. The partition wall 19 also separates and shields the lower portion of the casing 16 and the transmission mechanism therein. On the outside of the casing 16 and around the discharge opening 18 is provided a chute 21 for directed discharge of the cracked nuts.

A rotary drum 22 is disposed within the conical shell 15 so as to be free and spaced from said shell 15 at all sides. The exterior of the drum 22 is also conical in shape and is so disposed that its wider end is at the top, but spaced a short distance below the level of the top of the outer shell 15. The angle of inclination of the exterior cone form of the drum 22 is steeper than that of the interior cone of the shell 15 so that a downwardly diminishing annular chamber 23 is formed between the shell 15 and the drum 22.

Figure 6:
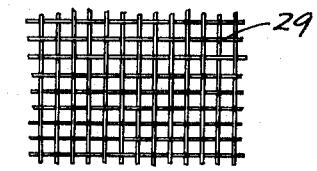
Figure 6 is a detail view of a screen lining for my machine.
Figure 7:
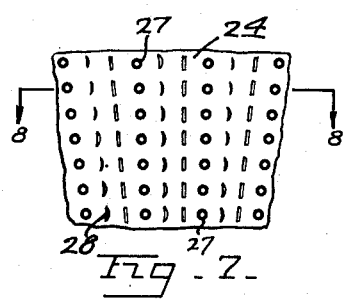
Figure 7 is a fragmental detail of a lining for my machine.
Figure 5:
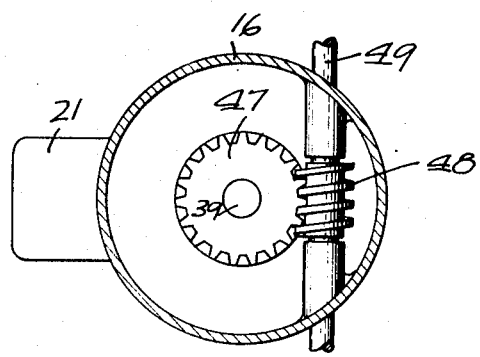
Figure 5 is a sectional bottom plan view of the transmission mechanism of my machine, the section being taken on line 5—5 of Fig. 4.
Figure 8:
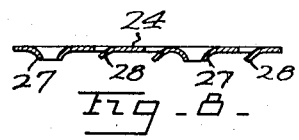
Figure 8 is a fragmental sectional view of said lining the section being taken on line 8—8 of Figure 7.

A conical lining 24, preferably made of sheet metal, is secured on to the interior face of the conical shell 15 and another conical lining 26 is secured on the exterior of the conical drum 22. The linings 24 and 26 are opposite each other and each lining has comparatively shallow projections formed thereon extended toward the other lining. The projections in this illustration are shown as formed in alternate substantially axial rows by the struck out edges of punchings 27, and by inclined tongues 28, which latter on the drum lining 26 face in the direction of drum rotation and in the shell lining 24 in a direction substantially tangential and opposite to the drum rotation. In connection with certain types of nuts, having very brittle shells, the type of lining illustrated in Fig. 6 may be used. This lining 29 is made of strong wire-mesh or screening and it is secured in place similarly to the sheet metal linings 24 and 26. The said linings are held in place, for instance by screws 31, so as to be readily detachable and replaceable.

The conical shell 15 is covered by a plate 32 having a central aperture 33 and has a feed hopper 34 on its top aligned with said aperture 33 to feed the nuts into the shell 15. The bottom of the hopper 34 is formed by a removable plate 36 which has a central opening 37 opposite the feed aperture 33. For various types of nuts plates 36 with different size openings are placed into the hopper 34.

The drum 22 is supported on a shaft 38 which latter is journaled in a vertical bearing 39 on the partition wall 19. A collar 41 on said shaft 38 rests on the top of the bearing 39 to support the shaft 38 in vertical position centrally of the outer shell 15. The upper end of the shaft 38 has an external worm 42 formed thereon, which is slightly longer than the height of the drum 22. The central hole 43 of the hollow drum 22 is larger than the diameter of the shaft 38 to allow unobstructed vertical adjustment of the drum 22. An internally threaded hub 44 engages the worm 42. The hub 44 and the drum 22 are held against movement relatively to the shaft 38 by a key 46. It is to be noted that the worm 42 has only one key way, but the drum hub 44 has four keyways at right angles to each other, therefore when the key 46 is removed the drum 22 may be vertically adjusted as finely as one-fourth of a turn of the worm 42. The key 46 extends upwardly beyond the shaft 38 and through the aperture 33 and opening 37 into the hopper 34. As the shaft 38 is rotated the key 46 is moved around on a circular path and agitates and loosens the nuts in the hopper 34 so as to prevent jamming and assure continuous feeding.

The shaft 38 has a gear 47 on its lower end below the partition wall 19, and a worm 48 is in mesh with said gear 47. A drive shaft 49 is journalled transversely in the casing 16 and it is suitably connected at one end to an electric motor 51. At its other end the drive shaft 49 has a pulley 52 for connection to any suitable prime-mover, when electricity is not easily available.

A selecting or separating airstream is created by any suitable means, such as by a rotary fan 53 driven by a suitable belt drive 54 from the drive shaft 49. The fan 53 is arranged at one side and below the casing 16, therefore it is preferable that either the legs 17 be made long, or a support 56 be provided to space the apparatus well above the ground or other supporting surface. The fan 53 is so arranged that it blows a stream of air across the discharge end of the chute 21 at the point where the cracked and shelled nuts drop from said chute 21. The air stream so created is to be sufficiently strong to carry the nuts to a limited, desired distance horizontally. The same air stream carries heavier objects to a lesser distance than lighter objects, hence the meat of the nuts, which is the heaviest, drops out of the air stream first, the shells with some meat in them, if any, are carried further away before dropping, and the empty shells are blown the farthest. Below the successive points where meat, the partly cleaned shells, and the empty shells, drop down from said air stream comparatively wide receptacles 57, 58, and 59 are placed in which said meat, partly empty shells, and empty shells are respectively collected. A suitable upright screen 61 at the farthest side of the receptacle 59 catches the empty shells that may be blown beyond the shell box 59.

In operation the machine, heretofore described cracks and shells and separates all kinds of nuts large or small. The only adjustment required is the raising or lowering of the drum 22 so that the lower end of the conical chamber 23 is of the proper width. Then the nuts are dumped into the hopper 34 either by hand, or by a conveyor or the like discharging into a feed trough 62. The nuts in the hopper are shaken and loosened by the upper end of the key 46 and drop into the shell 15. As the nuts work their way downwardly in the conical chamber 23 by gravity they are rolled between the projections of the rotating drum lining 26 and the stationary shell lining 24. The width of the conical chamber 23 diminishes downwardly therefore not only the cracking force increases but the simultaneous rolling and increasing squeezing of the cracked nuts on and by said projections of said linings strips the shells from the meat of the nuts without any injury to the meat. Experience shows that the drum 22 may be so finely adjusted downwardly as to cleanly shell nuts as small as pine nuts. The shell and the meat of the cracked and shelled nuts drop from the chamber 23 onto the partittion wall 19 and then pass out through the opening 18 and chute 21. As the shells and meat of the nuts drop out of the chute 21 the air stream created by the fan 53 sorts the meat from the shells in the manner heretofore described.

This machine may be made in portable size and carried to and used directly in the orchard. The machine is simple and its operation is fully automatic. The initial adjustment of the drum can be performed before shipping to a grower. The linings of the shell and drum may be easily replaced, when worn, by any mechanic or even by laymen. The machine after it is set up does not require any further regulation or adjustments and it is readily operated by the average labor ordinarily available to growers.

Having thus described my invention what I now claim is:

1. In a nut shelling machine of the character described, a hollow casing having downwardly inclined inner shelling periphery, a rotary member within said casing having downwardly inclined outer shelling periphery spaced from the inner periphery of said casing, a hopper connected to said casing, a shaft to support said rotary member in place, means to rotate said shaft, adjustable connection between the shaft and said rotary member, an element to fix said connection in an adjusted position being extended into said hopper to agitate the nuts in said hopper when said member is rotated.

2. In a nut shelling machine, the combination with a hollow member having a downwardly converging interior surface, and another member within the hollow member having a conical downwardly converging exterior surface spaced from said interior surface of said hollow member, one of said members being rotatable relatively to the other; of a lining on each of said surfaces being made of firm sheet material, substantially axial rows of projections on each of said linings being alternately formed in rows by the struck out edges of punchings in said lining and in rows by inclined tongues, the tongues of the lining on the rotary member inclining in the direction of rotation and on the other member tangentially to and in opposite directiton to said rotation.

3. In a nut shelling machine the combinattion with a conical drum rotated in a conical shell both converging downwardly toward a discharge, of a drum lining, a shell lining, both linings being made of a firm sheet of material, projections on each lining formed in substantial axial rows alternately made of the struck out edges of punchings in said sheet material and of tongues extended from said sheet material into the space between the drum and the shell, said tongues being inclined tangentially relatively to the direction of rotation of the drum but the tongues on the shell lining extending in opposite direction to the tongues of the drum lining.

4. In a nut shelling machine having a drum rotated in a shell both converging downwardly toward a discharge, in combination a drum lining, a shell lining, both linings being made of a firm sheet material, projections on each lining extended into the space between the linings and being formed in alternate rows of punchings and tongues, the tongues extending substantially tangentially to the direction of drum rotation but the tongues on one lining extending in opposite direction to the tongues of the other lining, said linings being detachable respectively from said drum and from said shell, and means to detachably secure each of said linings in place.

5. In a nut shelling machine, a hollow casing having downwardly converging inward periphery, a rotary drum within the casing having downwardly converging outer periphery spaced from said inner periphery, means on the adjacent surfaces of said casing and said drum to shell nuts therebetween, means to rotate said drum, said rotating means being extended from the lower end of the casing upwardly, adjustable means of connection between the drum and the rotating means, a hopper on the upper end of the casing having a feeding opening above said drum, and an element to fixedly hold said drum in an adjusted position on said rotating means, said element being extended through the top of the casing and through said feeding opening into said hopper to agitate the nuts at said opening.

PAUL DRAGON.